United States Patent
Cohen et al.

(10) Patent No.: US 7,870,136 B1
(45) Date of Patent: Jan. 11, 2011

(54) CLUSTERING DATA WITH CONSTRAINTS

(75) Inventors: Ira Cohen, Sunnyvale, CA (US); Blaine Nelson, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 11/753,120

(22) Filed: May 24, 2007

(51) Int. Cl.
*G06F 7/00* (2006.01)
*G06F 17/30* (2006.01)

(52) U.S. Cl. .................... 707/737; 706/45
(58) Field of Classification Search ........... 707/6, 707/5, 204, 101, 2, 737; 702/4; 704/245, 704/205, 246; 706/12, 45
See application file for complete search history.

(56) References Cited

U.S. PATENT DOCUMENTS

| | | | |
|---|---|---|---|
| 5,528,494 A * | 6/1996 | Moses | 702/4 |
| 5,598,507 A * | 1/1997 | Kimber et al. | 704/246 |
| 5,659,662 A * | 8/1997 | Wilcox et al. | 704/245 |
| 5,699,479 A * | 12/1997 | Allen et al. | 704/205 |
| 6,012,058 A * | 1/2000 | Fayyad et al. | 707/6 |
| 6,049,797 A * | 4/2000 | Guha et al. | 707/6 |
| 6,243,580 B1 * | 6/2001 | Garner | 455/428 |
| 6,263,334 B1 * | 7/2001 | Fayyad et al. | 707/5 |
| 6,374,266 B1 * | 4/2002 | Shnelvar | 707/204 |
| 6,947,933 B2 * | 9/2005 | Smolsky | 707/693 |
| 2005/0234955 A1 * | 10/2005 | Zeng et al. | 707/101 |
| 2006/0074821 A1 * | 4/2006 | Cristianini | 706/12 |
| 2007/0011039 A1 * | 1/2007 | Oddo | 705/10 |

OTHER PUBLICATIONS

Berson, Alex et al, Master Data Management and Customer Data Integration for a Global Enterprise, May 1, 2007, McGraw-Hill Osborne, pp. 91, 261-273.*

Lange, Tilman et al, Learning with Constrained and Unlabelled Data, Jun. 20-25, 2005,. IEEE Computer Society Conference on Computer Vision and Pattern Recognition, 2005. CVPR 2005, vol. 1, pp. 731-738 vol. 1 Digital Object Identifier 10.1109/C.*

Kuncheva, Ludmila et al., Evaluation of Stability of k-means Cluster Ensembles with Respect to Random Initialization, Nov. 2006, IEEE Transactions on Pattern Analysis and Machine Intelligence, vol. 28, No. 11, pp. 1798-1808.*

Shi, Rongjie et al., Supervised Graph-Theoretic Clustering, Oct. 13-15, 2005, ICNN&B '05. International Conference on Neural Networks and Brain, 2005, vol. 2, pp. 683-688.*

Yeung, Dit-Yan et al., A Kernel Approach for SemiSupervised Metric Learning, Jan. 2007, IEEE Transactions on Neural Networks, vol. 18, No. 1.*

(Continued)

*Primary Examiner*—James Trujillo
*Assistant Examiner*—Pavan Mamillapalli

(57) ABSTRACT

A method for clustering data using pairwise constraints that includes receiving a set of data for clustering, the set of data includes a plurality of data units; identifying soft pairwise constraints, each indicating a relationship between two of the plurality of data units in the set of data and having an associated confidence level indicating a probability that each pairwise constraint is present; and clustering the plurality of data units in the set of data into a plurality of data partitions based at least on a chunklet modeling technique that employs the soft pairwise constraints.

20 Claims, 5 Drawing Sheets

OTHER PUBLICATIONS

Basu, S. et al., "A Probabilistic Framework for Semi-Supervised Clustering", Proc. of the 10th ACM SIGKDD, p. 59-68, Seattle, WA, Aug. 2004.

Lu, Z. et al., "Semi-Supervised Learning with Penalized Probabilistic Clustering", downloaded Mar. 3, 2007.

Shental, N. et al., "Computing Gaussian Mixture Models with EM Using Equivalance Constraints", downloaded Mar. 30, 2007.

* cited by examiner

CLUSTERING DATA WITH CONSTRAINTS

BACKGROUND

Clustering is the traditional problem of learning a partition of an observed data set $X=\{x_i\}_{i=1}^N$ of N data points or data vectors into K clusters. The traditional goal is to choose a partitioning $Y=\{y_i \in \{1 \ldots K\}\}_{i=1}^N$ that optimizes an objective function $\Im(X, Y)$; e.g., minimizing intracluster variance. However, such broad clustering objectives are not necessarily congruent with the particular notion of separation for any given task. This has motivated the incorporation of prior knowledge to guide the clustering process toward a desirable partition. One form of prior knowledge is pairwise constraints among a subset of data points, wherein the constraints indicate a relationship between pairs of data points, e.g. whether two data points belong to the same group or label (must-link) or to different groups or labels (cannot-link). In recent years, clustering with pairwise constraints emerged as a new paradigm for semisupervised clustering. In this framework, the clustering agent is given observations X and a set of constraints C composed of pairwise must-link and cannot-link constraints specifying points that should or should not be clustered together, respectively. These constraints are typically assumed to be either given by an expert or inferred from domain knowledge.

There exist constrained clustering techniques or algorithms that directly incorporate constraints into the clustering procedure. For example, some constrained clustering algorithms use modifications to graph-based techniques. Other techniques explicitly used the constraints to reduce the search space of common clustering algorithms. More recent techniques incorporate the constraints directly into their models, resulting in probabilistic models that augment mixture models by directly modeling the constraints.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
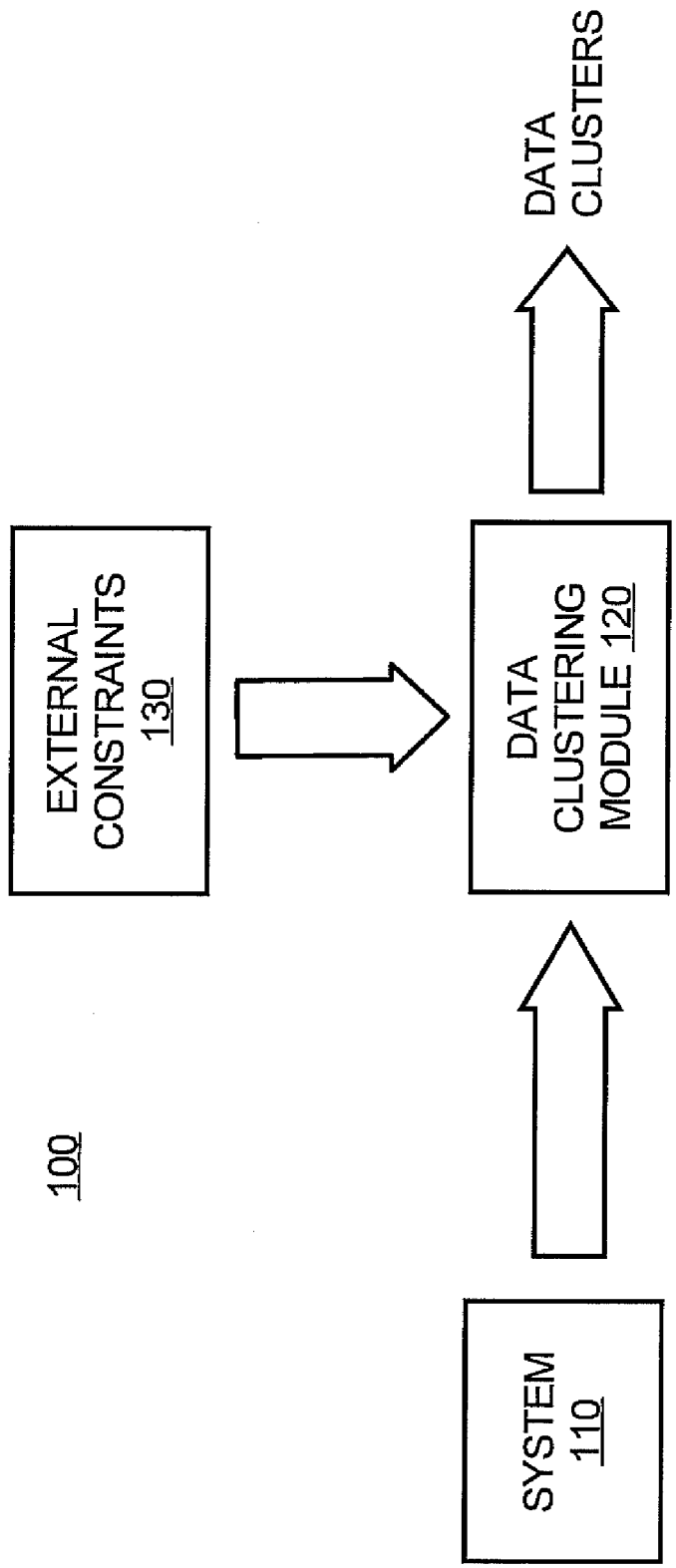
FIG. 1 illustrates a system wherein one or more embodiments may be practiced.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Consider the basic problem of clustering a set X of data points or vectors in K clusters using a model parameterized by $\theta$ (e.g., a set of centroids $\{\mu_c\}$) with side information in the form of a set of constraints C that include pairwise must-link and cannot-link constraints. Each must-link constraint (i↔j) specifies that the points i and j should be in the same cluster or group. Similarly, every cannot-link (k↔l) specifies that k and l should not be in the same cluster. Constraints that are strictly enforced are called absolute. That is, any configuration that violates an absolute constraint has zero probability. Constraints that may be violated are called soft constraints, and they also have an associated violation penalty. Here, $W_{ij} \in [0, +\infty]$ denotes the penalty for violating a soft constraint between i and j (the case of absolute constraints is equivalent to restricting $W_{ij} \in [0, +\infty]$).

In a classical mixture model (a mixture of Gaussians), there are two assumptions of independence: (1) given the model's parameters $\theta$ of the distribution (e.g., mean, variance, etc.), all labels are independent, and (2) given its label $y_i$, the data point $x_i$ is independent of all other labels and data. Formally, these are:

$$P(Y \mid \Theta) = \prod_{i=1}^{N} P(y_i \mid \Theta). \qquad \text{Equation 1}$$

$$P(X \mid Y, \Theta) = \prod_{i=1}^{N} P(x_i \mid y_i, \Theta). \qquad \text{Equation 2}$$

These assumptions define the fundamental components of the mixture model: the prior distribution on the labels and the data models. Now, consider probabilistic models that extend the classic mixture models by constructing a hidden Markov random field (HMRF) on the labels, as described, for example, in S. Basu et al. in "A probabilistic framework for semi-supervised clustering," Proceedings of the Tenth ACM SIGKDD International Conference on Knowledge Discovery and Data Mining (KDD-2004), pp. 59-68. In an HMRF, the must-link and cannot-link constraints are represented graphically by undirected links between labels and the graph is assumed to be Markovian: the distribution of a label depends only on its neighborhood $N_i \triangleq \{i \mid (i, j) \in C\}$. Thus, for the HMRF the prior distribution satisfies:

$$P(y_i \mid Y_{-i}, \Theta, C) = P(y_i \mid Y_{N_i}, \Theta, C), \qquad \text{Equation 3}$$

where $Y_{-i}$ denotes a set of all labels other than $y_i$.

An HMRF violates the independence assumption in Equation 1 but preserves the data model in Equation 2. The new prior distribution that replaces Equation 1 is:

$$P(Y \mid \Omega_C, \Theta, C) \propto P(Y \mid \Theta) P(\Omega_C \mid Y, \Theta, C), \qquad \text{Equation 4}$$

where $\Omega_C$ is the event that Y is consistent with the constraints. Here, $P(Y \mid \Theta)$ is the original prior probability given in Equation 1 and $P(\Omega_C \mid Y, \Theta, C)$ is a weighting function for constraint violations. The form of this weighting function is a direct consequence of the HMRF structure. The Hammersley-Clifford theorem shows that the HMRF's Markovian assumption is equivalent to a Gibbs distribution. The particular form chosen is defined by a penalty $V_{ij}$ as:

$$P(\Omega_C \mid Y, \Theta, C) \propto \exp\left\{-\sum_{i=1}^{N} \sum_{j \in N_i} V_{ij}\right\}, \qquad \text{Equation 5}$$

-continued $$V_{ij} = \begin{cases} -\Pi\{y_i = y_j\} \cdot W_{ij} \text{ for } i \leftrightarrow j; \\ \Pi\{y_i = y_j\} \cdot W_{ij} \text{ for } i \not\leftrightarrow j; \\ \text{and } 0 \text{ for } o.w. \end{cases} \quad \text{Equation 6}$$

and where $\Pi\{\cdot\}$ is the indicator function of an event. Finally, the conditional distribution for the label $y_i$ is:

$$P(y_i \mid Y_{N_i}, \Theta, C) \propto \exp\left\{-2\sum_{j \in N_i} V_{ij}\right\}. \quad \text{Equation 7}$$

The posterior distribution for the label $y_i$ is given by:

$$P(y_i \mid X, \Theta, C) = \sum_{Y_{-i}} \underbrace{P(X \mid Y, \Theta)}_{\text{data model}} \underbrace{P(Y \mid \Theta, C)}_{\text{label prior}}. \quad \text{Equation 8}$$

In theory, this posterior distribution may be computed exactly using the junction tree algorithm. However, it may be approximated by, for example, a chunklet model as described in, for example, Shental et al., "Computing Guassian mixture models with EM using equivalence constraints," NIPS. MIT Press, 2003, which is herein incorporated by reference in its entirety. The chunklet model is described next. That is, if all constraints are correct, the probability problem may be restricted to sets of only absolute constraints. In this setting, relational semantics of the constraints may be exploited by the chunklet model that employs the known iterative approach of Expectation Maximization (EM) to simplify the posterior inference in Equation 8, as described below.

The case of the absolute constraints leads to a Gibbs prior that assigns equal probability to every consistent assignment and zero probability otherwise. Thus, Equation 5 reduces to:

$$P(\Omega_{\hat{C}} \mid Y, \Theta, C) \propto \Pi\{Y \in \Gamma_{\hat{C}}\}$$

where $\hat{C}$ is the set of absolute constraints and $\Gamma_{\hat{C}}$ is the set of assignments consistent with them. Moreover, because all constraints are satisfied, the chunklet model exploits the properties of the constraints. In particular, the must-link is an equivalence relation and induces a partition of the data pints into equivalence classes called chunklets—a set of points that belong to the same cluster. The chunklets are defined by the transitive closure of the must-link graph and the L-th chunklet is modeled as a group of points with a single common label, $y_L^{ch}$. Thus, the analog of Equation 8 for a chunklet is:

$$P(y_L^{ch} \mid X, \Theta) = P(y_L^{ch} \mid \Theta) \prod_{i \in L} P(x_i \mid y_L^{ch}, \Theta). \quad \text{Equation 9}$$

The grouping behavior of the chunklets is desirable in the following sense: the points of a chunklet act as a single entity that penalizes large deviations. For instance, in a K-means setting with a Gaussian data model, maximizing a chunklet's posterior is equivalent to minimizing the sum of the squared distance of each point in the chunklet to the clusters' centroids. Finally, cannot-link constraints also transfer to the chunklets; that is, $i \in L$ and $j \in M$ and $i \not\leftrightarrow j$ implies $L \not\leftrightarrow M$.

Prior-art clustering algorithms with constraints, such as the chunklet model described above, typically require user input of hard constraints or soft constraints in the form of arbitrary weights for partitioning of the data of interest. User-input constraints are often difficult and expensive to obtain because they typically require human expertise. Hard constraints are rigid because they do not allow for errors in the specification of constraints between data samples, which in turns leads to degraded clustering performance. That is because one of the most important practical properties in constrained clustering is robustness to misspecification of constraints by human experts. As with any data, constraints are subject to a degree of inaccuracy depending on the task. However, those techniques used to make clustering algorithms efficient or accurate may lead to poor behavior under even small amounts of error in the constraints. Particularly, constraint propagation is sensitive to misspecified constraints. Consider the transitive closure of must-link constraints, wherein a single incorrect constraint between points i and j is propagated to their entire transitive neighborhoods. Thus, the above-described chunklet model, which assumes error-free constraints, is substantially degraded by even small levels of error.

The conventional technique for handling misspecified constraints is to allow constraint violations but penalize them with arbitrary weights to signify the constraint's validity, such as in S. Basu et al. in "A probabilistic framework for semi-supervised clustering," *Proceedings of the Tenth ACM SIGKDD International Conference on Knowledge Discovery and Data Mining* (KDD-2004), pp. 59-68, Seattle, Wash., August 2004. However, in the conventional technique there is no semantic meaning associated with the weights, such as the weights $W_{ij}$ specified in Equation 6. These penalty weights are unitless, and their salience is data-dependent. For example, while the weight 50 is larger than 5, it is unclear how much more of an impact the former will have than the latter. Furthermore, past clustering algorithms with constraints have not been used for system diagnosis, whereby measurements taken from systems during periods of failures or problems, along with constraints provided by operators, are clustered together to help identify different problems and their severity.

Accordingly, described herein are methods and systems for providing data clustering by extending the above-described chunklet model to handle user-input soft constraints for soft partitioning of the data of interest. The soft constraints are handled by directly sampling constraints to build probabilistic chunklets using weights representing a user's confidence in each constraint rather than using approximations to the weighted HMRF with arbitrary penalty weights. Furthermore, various embodiments provide data clustering with automatically-generated constraints from the partitioning of feature sets derived from the data (as opposed to user-input constraints) and employ the generated data clusters to diagnose a system state or status. Soft constraints, in the form of must-link and cannot-link constraints extended to include a confidence (or probability) level in a range from 0 to 1 for each constraint, enable probability assignments to the data clustering, which then allow the resulting data clusters to be used in a variety of different automated decision making tasks where alternative choices may be made. Automatically generated constraints avoid the need for user-input constraints that may be difficult or expensive to obtain. Furthermore, the use of generated data clusters for system diagnosis enables users to identify a correlation between a system health and those data clusters that contribute to such a health.

System

FIG. 1 illustrates a block diagram of an environment 100 wherein an embodiment may be practiced. The environment 100 includes an information technology (IT) system 110 and a data clustering engine module (hereinafter, "clustering module") 120. As referred herein, and as understood in the art, information technology, or IT, encompasses all forms of technology, including but not limited to the design, development, installation, and implementation of hardware and software information or computing systems and software applications, used to create, store, exchange and utilize information in its various forms including but not limited to business data, conversations, still images, motion pictures and multimedia presentations technology and with the design, development, installation, and implementation of information systems and applications. IT distributed environments may be employed, for example, by Internet Service Providers (ISP), web merchants, and web search engines to provide IT applications and services to users. Thus, the IT system 110 is operable to include one or more computing machines, each computing machine hosting one or more software applications or components. Examples of computing systems include but are not limited to personal computers, workstations, mainframe computers, web servers, application servers, database servers.

The IT system 110 is instrumented to generate a set of data having a plurality of data vectors $\vec{X}_1 \ldots \vec{X}_n$ (or any other desired data units) that represent a wide range of metrics (data measurements) relating to the system 110 and applications hosted thereon. Each data vector $\vec{X}_i$ (where i=1 . . . n) includes a plurality of data features $[x_1, x_2, \ldots, x_m]$ for such a data vector. For example, a data vector $\vec{X}_i$ represents metrics for an application running on the system 110 at time interval i, and the data features for such a data vector include application performance data, such as volume (e.g., $x_1$), response time (e.g., $x_2$), and failure counts (e.g., $x_3$). The data vector $\vec{X}_i$ may also represent transformations of data being measured, such as signatures extracted from measurements of systems as found in, for example, U.S. Pat. No. 7,184,935, which is herein incorporated by reference in its entirety. Commercially available data collection tools such as OpenView software by Hewlett Packard® Company and Microsoft NT 4.0 Performance Counters by Microsoft° may be used as instruments to monitor the system 110 and obtain the aforementioned data vectors.

In one embodiment, the clustering module 120 is operable to provide data clustering of the data vectors $\vec{X}_1 \ldots \vec{X}_n$ as received from the system 110 with external inputs 130 from one or more system operators, or any other external knowledge, about pairwise constraints with confidence. To provide data clustering into different clusters that represent, for example, different predetermined system problems, the clustering module 120 employs a generative probabilistic model approach to estimate cluster centers and parameters, after which assignment of the data vectors $\vec{X}_1 \ldots \vec{X}_n$ to the different clusters is done using maximum likelihood computation. This novel model is a sampled chunklet model or process that extends the prior-art chunklet model to handle soft constraints by directly sampling constraints to build probabilistic chunklets rather than using approximations to the weighted HMRF. The estimation of the cluster parameters is done using any known iterative approach or technique, such as expectation maximization (EM), with modification to initially include sampling of the constraints based on their confidence and forming chunklets of constraints for each sample, and performing the EM afterwards. That is, according to one embodiment, the sampled chunklet model is operable to construct a single sample by sampling each constraint based on confidences provided by a user (such as an expert) and to infer chunklets from the sampled constraints; i.e., a sample from the space of viable chunklets. For each such sample, the conventional chunklet method is applied, and an average over all samples is then used to compute the posterior distribution of the groups or labels. Thus, unlike previous methods that employ chunklets, the method employed by the clustering module 120 allows for soft constraints based on confidences between pairs of data points. In another embodiment, the clustering module 120 is operable to automatically generate pairwise constraints with confidence, without an explicit user input of such constraints, prior to providing the aforementioned data clustering of the data vectors $\vec{X}_1 \ldots \vec{X}_n$.

Figure 2:
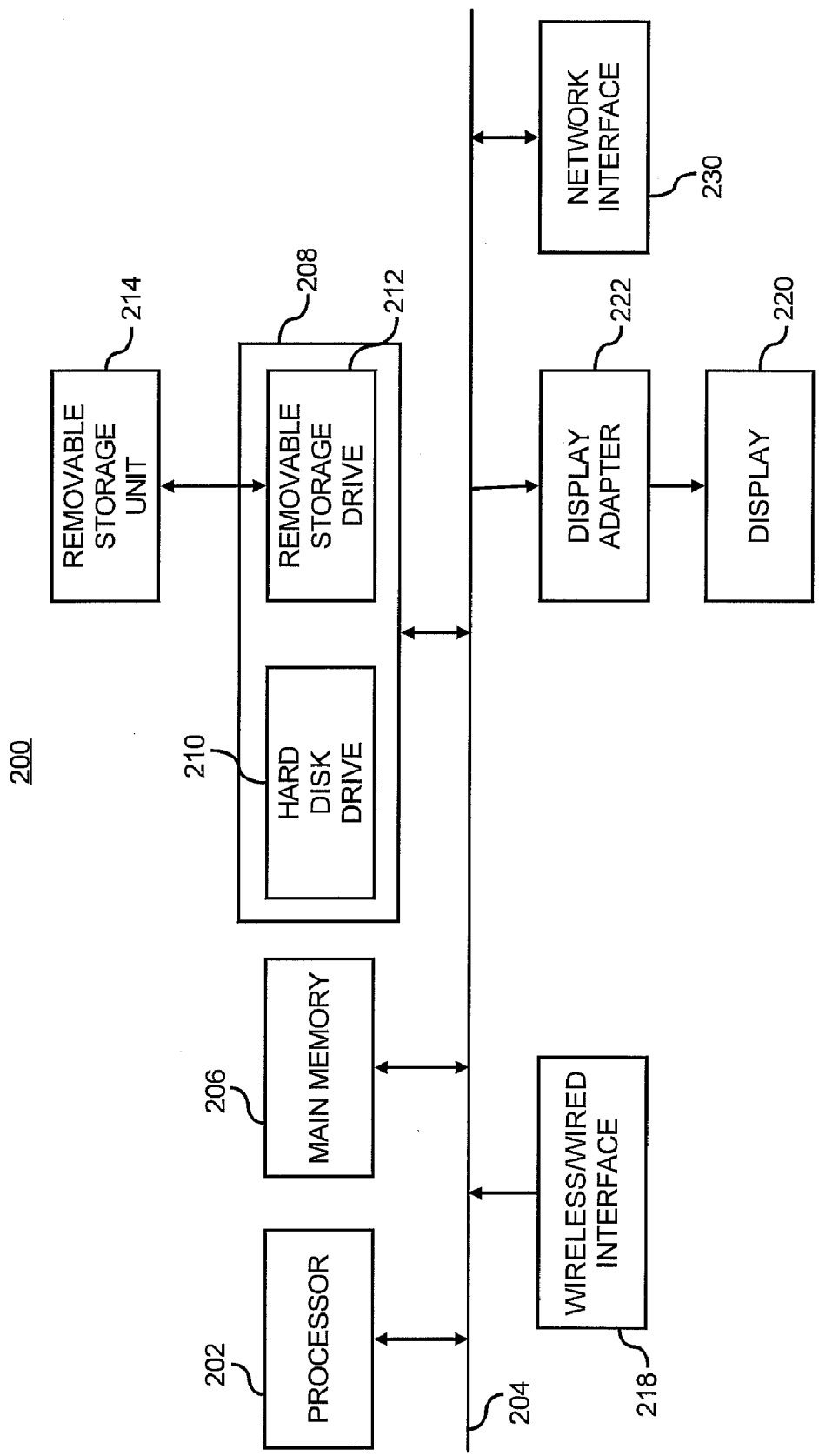
FIG. 2 illustrates a block diagram of a computerized system wherein one or more system components of a distributed environment may be practiced, in accordance with one embodiment.

FIG. 2 illustrates a block diagram of a computerized system 200 that is operable to be used as a platform for implementing the system 110 and the clustering module 120. Alternatively, the computerized system 200 is operable as a platform for implementing the entire environment 100.

The computer system 200 includes one or more processors, such as processor 202, providing an execution platform for executing software. Thus, the computerized system 200 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 202 are communicated over a communication bus 204 or through point-to-point links with other components in the computer system 200.

The computer system 200 also includes a main memory 206 where software is resident during runtime, and a secondary memory 208. The secondary memory 208 may also be a computer-readable medium (CRM) that may be used to store software programs, applications, or modules that implement the instrumentation for obtaining data vectors in the system 110, the module 120, or a part or parts thereof. Thus, the CRM is operable to store software programs, applications, or modules that implement the methods 300-500 as described later. The main memory 206 and secondary memory 208 (and an optional removable storage unit 214) each includes, for example, a hard disk drive and/or a removable storage drive 212 representing a floppy diskette drive, a magnetic tape drive, a compact disk drive, etc., or a nonvolatile memory where a copy of the software is stored. In one example, the secondary memory 408 also includes ROM (read only memory), EPROM (erasable, programmable ROM), EEPROM (electrically erasable, programmable ROM), or any other electronic, optical, magnetic, or other storage or transmission device capable of providing a processor or processing unit with computer-readable instructions. The computer system 200 includes a display 220 connected via a display adapter 222, user interfaces comprising one or more input devices 218, such as a keyboard, a mouse, a stylus, and the like. However, the input devices 218 and the display 220 are optional. A network interface 230 is provided for communicating with other computer systems via, for example, a network.

Process

Figure 3:
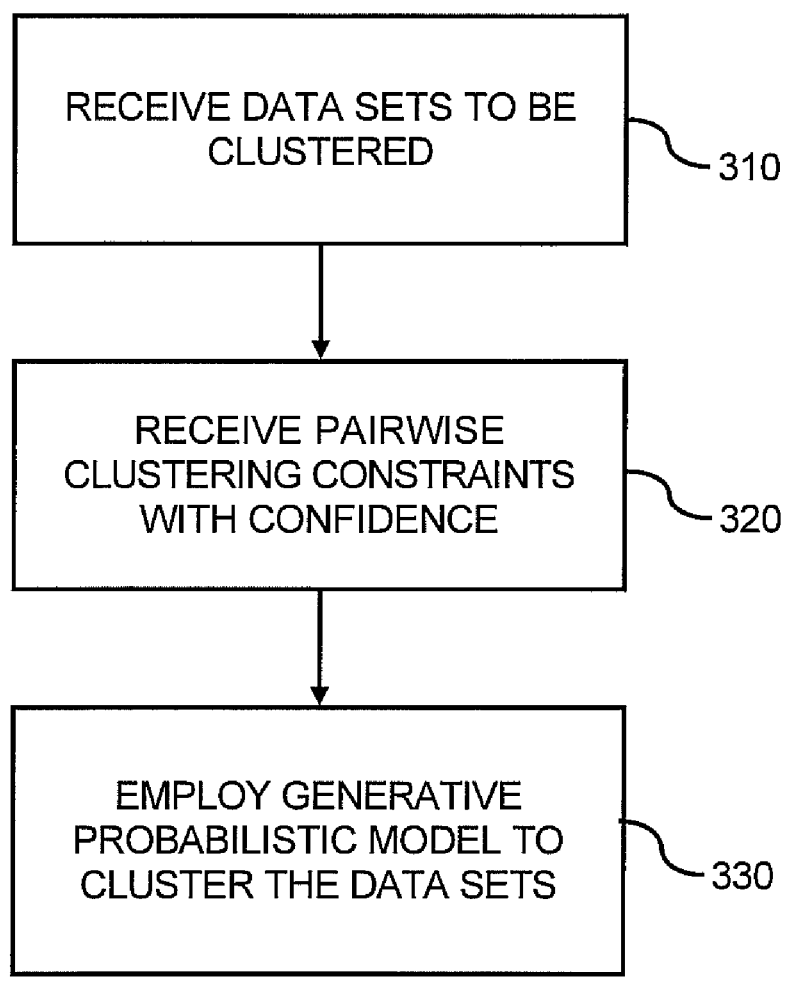
FIGS. 3-4 illustrate a method for clustering data using pairwise constraints with confidence, in accordance with one embodiment.
Figure 4:
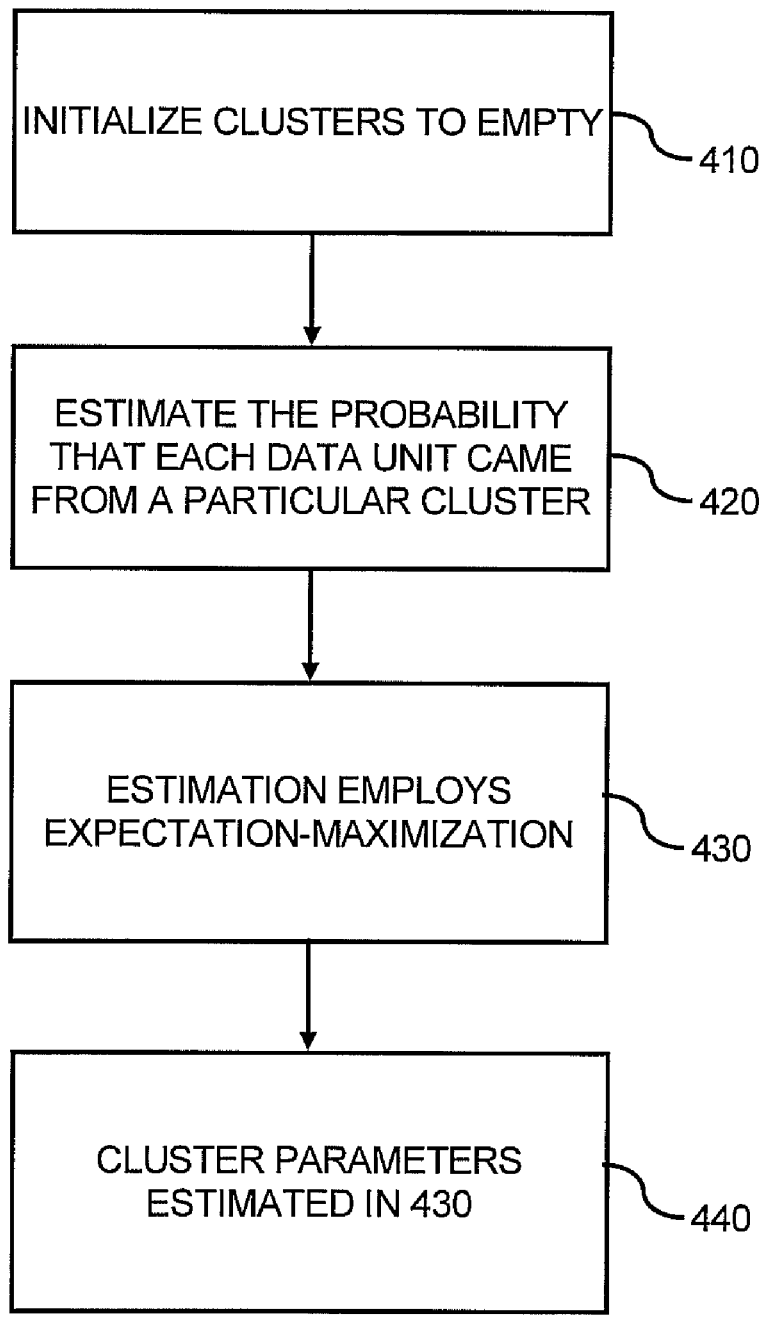

FIGS. 3-4 illustrates a flowchart diagram of a method 300 for clustering data using pairwise constraints with confidence as provided by user input or any other external knowledge. For illustrative purposes only and not to be limiting thereof, the method 300 is discussed in the context of the system environment 100 illustrated in FIG. 1.

At 310, the data sets or vectors $\vec{X}_1 \ldots \vec{X}_n$ are generated by the system 110 using any commercially available data collection tools, such as OpenView software available from Hewlett Packard® Company and Microsoft NT 4.0 Performance Counters available from Microsoft®. The generated data vectors $\vec{X}_1 \ldots \vec{X}_n$ are received or obtained by the clustering module 120.

At 320, the clustering module 120 also identifies pairwise clustering constraints with confidence for use in data clustering through receipt of user inputs 130 of such constraints. Each user-input pairwise clustering constraint is one of two types, a must-link constraint with confidence (e.g., $\vec{X}_1$ and $\vec{X}_2$ are in the same cluster with confidence or probability 0.9), and a cannot-link constraint with confidence (e.g., $\vec{X}_1$ and $\vec{X}_2$ are not in the same cluster with confidence or probability 0.9).

At 330, the clustering module 120 employs a generative probabilistic model (e.g., by using the iterative EM approach), to estimate the centers and other parameters of such clusters (e.g., means and standard deviations for each cluster's probability distribution), and to assign the data vectors $\vec{X}_1 \ldots \vec{X}_n$ to the different clusters. FIG. 4 illustrates further details of this novel sampled chunklet method or process 400.

Referring to FIG. 4, at 410, a plurality of clusters, classes, labels, or groups $y_1, y_2, \ldots, y_k$ are defined and initialized to empty.

At 420, the expectation or E-step of EM is initiated to estimate the probability that each data unit or vector $\vec{X}_i$ comes from or belongs to a cluster $y_i$, given the provided pairwise must-link and cannot-link constraints C that are associated with the data vector. That is, the probability $P(y_i|X, \Theta, C)$ is estimated by: a) sampling the must-link constraints and cannot-link constraints according to their probability or confidence; b) forming chunklets of constraints for each sample; and c) performing the E-step of the EM approach to obtain the probability $P(y_i|, \Theta, C)$, as further described below.

First, the pairwise constraints C of must-link and cannot-link constraints are sampled based on their confidence using any known sampling technique, such as the Monte Carlo sampling technique, to produce a set of samples $\{S_i\}$, wherein each sample includes must-link and cannot link constraints from the original set of pairwise constraints C that affects or constrains each data vector $\vec{X}_i$. That is, for each s-th sample in the set $S_i$, a set of must-link constraints is independently sampled or constructed to indicate the existence of the must-link i↔j in the s-th sample, and a set of cannot-link constraints is independently sampled or constructed to indicate the existence of the cannot-link i↔j in the sample. Second, the sampled must-links and cannot-links are then combined to form a set of sampled pairwise constraints Ĉ, i.e., chunklets of constraints, for the s-th sample.

Third, for each s-th sample in the set $S_i$, the aforementioned conventional chunklet model or algorithm is applied to perform the E-step of the EM approach by using the sampled constraints Ĉ to estimate the posterior distribution $P(y_i=k|X_i, Ĉ, S_i)$ of each data vector $\vec{X}_i$ (Ĉ is the parameter θ). Then, to estimate the final posterior distribution of each data vector $\vec{X}_i$, the posterior distribution from each sample of the set $S_i$ is computed using a weighted average, where the weights $W_i$ (one for each sample in Si) are the probability of inconsistencies or contradictions in the constraints that were sampled for each set Si.

At 430, given the estimated class membership posteriors $P(y_i=k|X_i, Ĉ, S_i)$, the clustering module 120 provides the EM algorithm, which the aforementioned estimation uses to compute the maximum likelihood estimates of the parameters for each posterior distribution $P(y_i=k|X_i, Ĉ, S_i)$ for each cluster $y_i$. The estimated parameters as computed here are then used to begin another E-step at 420, and the EM process is repeated until convergence to a local maximum of the assumed distribution.

At 440, once the EM process converges, the clustering module 120 clusters the parameters estimated at 430, i.e., it employs the resulting parameters for the maximized distributions $P(y_i=k|X_i, Ĉ, S_i)$ for different clusters $y_i \ldots y_k$ to assign the data vectors $\vec{X}_1 \ldots \vec{X}_n$ to the different clusters.

Figure 5:
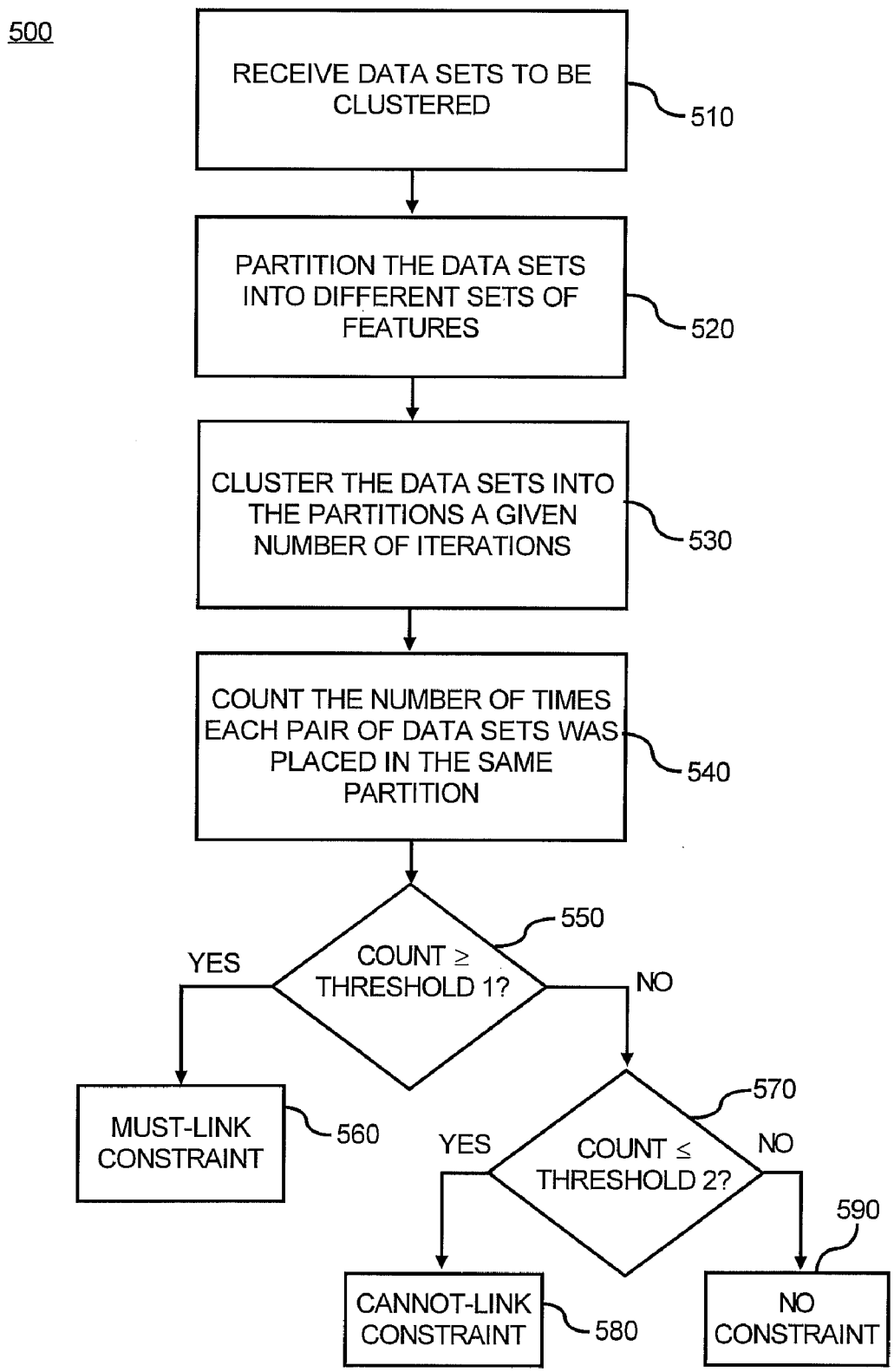
FIG. 5 illustrates a method for clustering data using pairwise constraints with confidence, in accordance with an alternate embodiment.

FIG. 5 illustrates a flowchart diagram of an alternative method 500 for clustering data using pairwise constraints with confidence without any explicit user input of the pairwise constraints. For illustrative purposes only and not to be limiting thereof, the method 500 is also discussed in the context of the system environment 100 illustrated in FIG. 1.

At 510, as with 310 in FIG. 3, the data vectors $\vec{X}_1 \ldots \vec{X}_n$ are generated by the system 110 using any commercially available data collection tools, such as OpenView software available from Hewlett Packard® Company and Microsoft NT 4.0 Performance Counters available from Microsoft®. The generated data vectors $\vec{X}_1 \ldots \vec{X}_n$ are received or obtained by the clustering module 120.

At 520, unlike at 320 in FIG. 3, the clustering module 120 does not receive user inputs 130 of pairwise clustering constraints. Instead, clustering module 120 proceeds to automatically generate or compute pairwise constraints by initially partitioning the data vectors $\vec{X}_1 \ldots \vec{X}_n$ into different sets of features. As noted earlier, because each data vector $\vec{X}_i$ is made of m data features $[x_1, x_2, \ldots, x_m]$, it is partitioned into k sets of features, where k≦m (k and m are both integers).

At 530, the clustering module 120 proceeds to cluster the data vectors $\vec{X}_1 \ldots \vec{X}_n$ of each k partition to clusters using any known or standard clustering algorithm, such as K-means, mixture of Gaussians and hierarchical clustering, L iterations with different random cluster partition starting points. This partitioning may come from domain experts (splitting the m features into different sets based on their functions, such as related system features, application features, etc.), be randomly picked, or be provided by other processes such as projecting the m features into sets of features using principal component analysis, random projections, and the like.

At 540, for each pair of the data vectors $\vec{X}_1 \ldots \vec{X}_n$, the clustering module 120 counts the number of times the pair was placed in the same partition or cluster among the L clustering (L is an integer).

At 550, for each pair of the data vectors $\vec{X}_1 \ldots \vec{X}_n$, the clustering module 120 determines if the count obtained at 540 is greater than or equal to (or just greater than) a predetermined threshold.

At 560, upon a determination that the count passes the predetermined threshold, the clustering module 120 provides a must-link constraint between the pair. The must-link constraint may be extended to include a confidence level based on how high the count is above the predetermined threshold. For example, the higher the count, the higher the confidence level for the must-link.

At 570, however, upon a determination that the count does not pass the predetermined threshold, the clustering module 120 further determines whether the count obtained at 540 is lower than or equal to (or just lower than) a second predetermined threshold. If yes, the clustering model 120 provides a cannot-link constraint between the pair at 580; otherwise, no constraint is provided at 590 The cannot-link constraint may be extended to include a confidence level based on how low the count is below the predetermined threshold. For example, the lower the count, the higher the confidence level for C. It should be understood that the determinations at 550 and 570 may be switched so that cannot-link constraints may be identified before identifying the must-link constraints.

Once the must-link constraints and cannot-link constraints and their associated constraints are determined, the method 500 proceeds to cluster the data vectors $\vec{X}_1 \ldots \vec{X}_n$ using the now-obtained pairwise constraints as described in FIG. 3 at 330.

According to one embodiment, the above-described methods 300-500 may be used to further assist system administrators or other system users with system diagnoses. For example, for any automated machine-learning or other techniques that are operable to detect and diagnose failures and performance problems and output signatures of such system problems as data vectors $\vec{X}_1 \ldots \vec{X}n$ associated with classes or labels to indicate instances of the system problems or states (e.g., compliance state or violation state of a service level objective in a distributed system), the methods 300-500 may be leveraged to provide additional clustering or correlation of monitored data sets. To that extent, the system 110 in FIG. 1 may represent a diagnosis system that is employed to monitor and diagnose one or more other systems, such as distributed or enterprise IT systems. As provided by the methods 300-500, the additional clustering or correlation of the monitored data sets, which may be reported to the system administrators with associated different types of system problems, may provide system administrators with better diagnosis and root cause analyses of the problems, their severity, and their prototypical or exemplary characteristics.

Accordingly, the systems and methods as described herein provide a systematic methodology for data clustering that allows user-input or automatically-induced "soft" constraints (that is, constraints with associated probabilities or confidences) with "soft" partitioning of data when clustering with pairwise constraints. The clustering may be used to provide a partition of all instances of problems encountered in a system, which is then reported to a system administrator as K different types of problems. Such clustering leverages the knowledge of system problem signatures, such as those described in U.S. Pat. No. 7,184,935 to provide system administrators with better diagnosis and root cause analysis of system problems. For example, two instances of problems are encountered in a system and identified with system problem signatures or measured data vectors. Because the clustering is operable to provide a clustering of all instances of problems encountered, it is operable to partition the two instances of problems into 2 different clusters or labels, with one label indicating a mere problem instance, and the other label indicating a root cause of the problem instance. Without a clustering process that allows soft constraints with confidences, the two instances of problems may be clustered together as mere problem instances.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for clustering data using pairwise constraints, comprising:
    receiving a set of data for clustering, the set of data includes a plurality of data units;
    identifying soft pairwise constraints, wherein the soft pairwise constraints include, for each pair of data units in the set of data,
        a soft must-link constraint indicating that the respective pair of data units are in a same cluster and having a confidence level indicating a probability of the soft must-link constraint; and
        a soft cannot-link constraint indicating that the respective pair of data units are not in the same cluster and having a confidence level indicating a probability of the soft cannot-link constraint; and
    clustering the plurality of data units in the set of data into a plurality of data partitions based at least on a chunklet modeling technique that employs the soft pairwise constraints,
    wherein the chunklet technique includes sampling the soft must-link and cannot-link constraints associated with each respective pair of data units in the set of data according to their associated confidence levels.

2. The method of claim 1, wherein identifying the soft pairwise constraints comprises:
    receiving the soft pairwise constraints and the associated confidence level from user inputs for each of the soft pairwise constraints.

3. The method of claim 1, wherein identifying the soft pairwise constraints comprises:
    generating the soft pairwise constraints by computation.

4. The method of claim 1, wherein clustering the plurality of data units comprises:
    estimating a probability that each of the plurality of data units belongs to one of the plurality of data partitions based at least on the identified soft pairwise constraints that provide relationships of said each data unit to other data units in the set of data and their associated confidence levels;
    applying expectation maximization (EM) to compute maximized parameters for the estimated probability that each of the plurality of data units belongs to one of the plurality of data partitions; and
    assigning the plurality of data units to the plurality of data partitions based on the maximized parameters.

5. The method of claim 4, wherein estimating the probability that each of the plurality of data units belongs to one of the plurality of data partitions comprises:

sampling each of the identified soft pairwise constraints based on its associated confidence level to form sampled pairwise constraints;

employing a chunklet model to estimate the probability that each of the plurality of data units belongs to one of the plurality of data partitions based on the sampled pairwise constraints.

6. The method of claim 1, receiving the set of data for clustering comprises:

receiving the plurality of data units, each associated with metrics of an information technology (IT) system observed at an instance.

7. The method of claim 1, further comprising:

defining the plurality of data partitions as a plurality of predetermined problems in the IT system; and diagnosing the IT system to identify one of the plurality of predetermined problems in the IT system based on the defined plurality of data partitions and the clustering of the plurality of data units.

8. The method of claim 3, wherein generating the soft pairwise constraints by computation comprises:

partitioning the plurality of data units into a plurality of k sets;

clustering the data units in each of the plurality of k sets into a plurality of L clusters;

counting a number of times a pair of the plurality of data units is placed in a same cluster among the L clusters; and first determining whether the count number is greater than or equal to a first predetermined threshold.

9. The method of claim 8, wherein generating the soft pairwise constraints by computation further comprises:

upon the first determining that the count number is greater than or equal to the first predetermined threshold, generating a must-link constraint for the pair of data units, wherein the must-link constraint is one of the soft pairwise constraints.

10. The method of claim 9, wherein generating the soft pairwise constraints by computation further comprises:

computing the confidence level associated with the must-link constraint based on a difference between the count number and the first predetermined threshold.

11. The method of claim 8, wherein generating the soft pairwise constraints by computation further comprises:

second determining whether the count number is less than or equal to a second predetermined threshold; and upon the second determining that the count number is less than or equal to the second predetermined threshold, generating a cannot-link constraint for the pair of data units, wherein the cannot-link constraint is one of the soft pairwise constraints.

12. The method of claim 11, wherein generating the soft pairwise constraints by computation further comprises:

computing the confidence level associated with the cannot-link constraint based on a difference between the count number and the second predetermined threshold.

13. The method of claim 8, wherein each of the data units includes metrics for a plurality of m features in an information technology (IT) system, and $k \leq m$.

14. The method of claim 8, wherein clustering the data units in each of the plurality of k sets into a plurality of L clusters comprises:

clustering through L iterations, each with different random cluster partition starting points.

15. An apparatus for clustering data observed from an information technology (IT) system comprises:

means for receiving the observed data for clustering, the observed data includes a plurality of data vectors, each of the data vectors includes a plurality of m features;

means for computing soft pairwise constraints, including, for each pair of data vectors in the observed data, a soft must-link constraint indicating that the respective pair of data vectors are in a same cluster and having a confidence level indicating a probability of the soft must-link constraint; and a soft cannot-link constraint indicating that the respective pair of data vectors are not in the same cluster and having a confidence level indicating a probability of the soft cannot-link constraint; and means for clustering the plurality of data vectors in the set of data into a plurality of data partitions based at least on a chunklet modeling technique that employs the soft pairwise constraints, wherein the chunklet modeling technique includes sampling the soft must-link and cannot-link constraints associated with each respective pair of data vectors in the observed data according to their associated confidence levels.

16. The apparatus of claim 15, wherein the means for computing soft pairwise constraints comprises:

means for partitioning the plurality of data vectors into a plurality of k sets;

means for clustering the data vectors in each of the plurality of k sets into a plurality of L clusters;

means for counting a number of times a pair of the plurality of data vectors is placed in a same cluster among the L clusters;

means for first determining whether the count number is greater than or equal to a first predetermined threshold;

means for second determining whether the count number is less than or equal to a second predetermined threshold;

means for generating a must-link constraint for the soft pairwise constraint based on the first determining; and means for generating a cannot-link constraint for the soft pairwise constraint based on the second determining.

17. The apparatus of claim 16, wherein the number of k sets is less than the number of m features.

18. The apparatus of claim 16, wherein the number of L clusters is a number of iterations that the data vectors in each of the plurality of k sets are clustered with different random cluster partition starting points.

19. A computer readable medium on which is stored computer code executable by at least one computer processor to:

receive a set of data for clustering, the set of data includes a plurality of data units;

identify soft pairwise constraints, wherein the soft pairwise constraints include, for each pair of data units in the set of data, a soft must-link constraint indicating that the respective pair of data units are in a same cluster and having a confidence level indicating a probability of the soft must-link constraint; and a soft cannot-link constraint indicating that the respective pair of data units are not in the same cluster and having a confidence level indicating a probability of the soft cannot-link constraint; and cluster the plurality of data units in the set of data into a plurality of data partitions based at least on a chunklet modeling technique that employs the soft pairwise constraints, including sampling the soft must-link and cannot-link constraints associated with each respective pair of data units in the set of data according to the associated confidence levels.

20. The computer readable medium of claim 19, wherein the stored computer code executable therein by the at least one computer processor to identify the soft pairwise constraints is further executable to perform one of:

receiving the soft pairwise constraints and the associated confidence level from user inputs for each of the soft pairwise constraints; and generating the soft pairwise constraints by computation.

* * * * *

UNITED STATES PATENT AND TRADEMARK OFFICE
CERTIFICATE OF CORRECTION

| | | |
|---|---|---|
| PATENT NO. | : 7,870,136 B1 | Page 1 of 1 |
| APPLICATION NO. | : 11/753120 | |
| DATED | : January 11, 2011 | |
| INVENTOR(S) | : Ira Cohen et al. | |

It is certified that error appears in the above-identified patent and that said Letters Patent is hereby corrected as shown below:

In column 11, line 59, in Claim 13, delete "in" and insert -- m --, therefor.

Signed and Sealed this
Twelfth Day of April, 2011

David J. Kappos
*Director of the United States Patent and Trademark Office*